(12) United States Patent
Zhou et al.

(10) Patent No.: US 12,164,339 B2
(45) Date of Patent: Dec. 10, 2024

(54) DISPLAY PANEL AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Yang Zhou, Beijing (CN); Linhong Han, Beijing (CN); Huijuan Yang, Beijing (CN); Pengfei Yu, Beijing (CN); Yupeng He, Beijing (CN); Xin Zhang, Beijing (CN); Lu Bai, Beijing (CN); Tinghua Shang, Beijing (CN)

(73) Assignees: Beijing BOE Technology Development Co., Ltd., Beijing (CN); Chengdu BOE Optoelectronics Technology Co., Ltd., Sichuan (CN)

(*) Notice: Subject to any disclaimer, the term of this patent is extended or adjusted under 35 U.S.C. 154(b) by 226 days.

(21) Appl. No.: 17/920,911

(22) PCT Filed: Jun. 8, 2021

(86) PCT No.: PCT/CN2021/098968
§ 371 (c)(1),
(2) Date: Oct. 24, 2022

(87) PCT Pub. No.: WO2022/012228
PCT Pub. Date: Jan. 20, 2022

(65) Prior Publication Data
US 2023/0161381 A1    May 25, 2023

(30) Foreign Application Priority Data

Jul. 15, 2020   (CN) .......................... 202010680366.3

(51) Int. Cl.
*G06F 1/16*     (2006.01)
*G06F 1/26*     (2006.01)

(52) U.S. Cl.
CPC .............. *G06F 1/1652* (2013.01); *G06F 1/26* (2013.01)

(58) Field of Classification Search
CPC ........ G06F 1/1652; G06F 1/26; G06F 1/1637; G06F 1/1626; G09F 9/00
See application file for complete search history.

(56) References Cited

U.S. PATENT DOCUMENTS 9,113,545 B2 *   8/2015  Han ........................ H05K 7/00
9,490,215 B2 *  11/2016  Yang ..................... H01L 23/544
(Continued)

FOREIGN PATENT DOCUMENTS

CN        106601133 A      4/2017
CN        107424520 A     12/2017
(Continued)

OTHER PUBLICATIONS

Office Action dated May 19, 2022, issued in counterpart CN Application No. 202010680366.3, with English Translation. (32 pages).

*Primary Examiner* — Anthony M Haughton
*Assistant Examiner* — Theron S Milliser

(57) ABSTRACT

The display panel (100) includes an active area (R1) and a non-active area (R2), the non-active area (R2) includes a bending area (R211) and a controlling area (R212), the display panel (100) includes a substrate (1), a multilayer insulating layer (2) and a back-film component (3), the multilayer insulating layer (2) has a depression part (21), the thickness of the back-film component (3) that is located within the active area (R1) is less than the thickness of the back-film component (3) that is located within the controlling area (R212), and is greater than the thickness of the back-film component (3) that is located within the bending area (R211), the display panel (100) has a marker (5), the marker (5) is located within the non-active area (R2), and is (Continued)

separately disposed around the depression part, and the marker is suitable for serving as a correction reference of the bending area.

20 Claims, 3 Drawing Sheets

(56) References Cited

U.S. PATENT DOCUMENTS

| | | | |
|---|---|---|---|
| 10,446,770 B2* | 10/2019 | Kim | H10K 59/87 |
| 10,916,735 B2* | 2/2021 | Kwon | H10K 50/82 |
| 11,004,912 B2* | 5/2021 | Kim | H10K 77/111 |
| 11,049,885 B2* | 6/2021 | Zhang | G09F 9/301 |
| 11,069,762 B2* | 7/2021 | Chung | H05K 1/189 |
| 11,315,997 B2* | 4/2022 | Aoki | H10K 71/00 |
| 11,331,899 B2* | 5/2022 | Wang | H10K 71/80 |
| 11,348,952 B2* | 5/2022 | Zhang | H01L 27/1244 |
| 11,367,842 B2* | 6/2022 | Wang | H01L 27/1244 |
| 11,626,571 B2* | 4/2023 | Wang | H10K 59/1201 |
| | | | 257/40 |
| 11,641,764 B2* | 5/2023 | Aoki | H10K 59/1213 |
| | | | 257/40 |
| 11,711,962 B2* | 7/2023 | Kim | H10K 59/88 |
| | | | 257/40 |
| 11,871,647 B2* | 1/2024 | Wang | H10K 77/111 |
| 2013/0148312 A1* | 6/2013 | Han | H05K 1/028 |
| | | | 361/736 |
| 2015/0137102 A1* | 5/2015 | Yang | B32B 37/144 |
| | | | 156/227 |
| 2017/0351365 A1* | 12/2017 | Sasaki | G06F 3/0443 |
| 2019/0157589 A1* | 5/2019 | Kim | H10K 77/111 |
| 2019/0165332 A1* | 5/2019 | Kwon | G09G 3/3208 |
| 2019/0280075 A1* | 9/2019 | Chung | H10K 59/8731 |
| 2020/0168675 A1* | 5/2020 | Kim | G06F 3/0412 |
| 2020/0219956 A1* | 7/2020 | Aoki | G09F 9/30 |
| 2020/0243574 A1* | 7/2020 | Tian | H01L 27/1248 |
| 2020/0328234 A1* | 10/2020 | Zhang | G02F 1/1362 |
| 2020/0365627 A1* | 11/2020 | Zhang | H01L 27/1218 |
| 2021/0138782 A1* | 5/2021 | Wang | B32B 43/006 |
| 2021/0265433 A1* | 8/2021 | Kim | H10K 77/111 |
| 2021/0265589 A1* | 8/2021 | Wang | H10K 71/00 |
| 2021/0376263 A1* | 12/2021 | Wang | H10K 77/111 |
| 2022/0208919 A1* | 6/2022 | Aoki | G02F 1/1368 |
| 2022/0278289 A1* | 9/2022 | Wang | H10K 71/231 |
| 2023/0301161 A1* | 9/2023 | Kim | H10K 71/00 |
| | | | 257/40 |

FOREIGN PATENT DOCUMENTS

| | | |
|---|---|---|
| CN | 108305880 A | 7/2018 |
| CN | 109031745 A | 12/2018 |
| CN | 110828505 A | 2/2020 |
| CN | 111029290 A | 4/2020 |
| CN | 111244135 A | 6/2020 |
| CN | 111312773 A | 6/2020 |
| CN | 111383537 A | 7/2020 |
| JP | 2002-055634 A | 2/2002 |

* cited by examiner

DISPLAY PANEL AND DISPLAY DEVICE

CROSS REFERENCE TO RELEVANT APPLICATIONS

The present application is filed on the basis of and claims the priority of the Chinese patent application filed on Jul. 15, 2020 with the application number of 202010680366.3, which is incorporated herein in its entirety by reference.

TECHNICAL FIELD

The present application relates to the technical field of displaying and, more particularly, to a display panel and a display device.

BACKGROUND

In the related art, before the bending process of a display panel, back-film removal is performed to the display panel. However, in order to reduce the width of the border frame of the display panel, the heat-affected area of the back-film removal and the precision reference of back-film removal easily interfere. Further, the thickness of the back-film component within the heat-affected area is not even, which results in abnormality of the precision correction of the back-film removal, which affects the precision of the back-film removal, affects the product quality, and affects the yield of the bending of the display panel.

SUMMARY

The present application aims at solving at least one of the technical problems in the related art. In view of the above, the present application provides a display panel, wherein the display panel facilitates to realize the normal correction of the precision of the back-film removal, ensures the precision of the back-film removal, that effectively increases the yield of the product.

The present application further provides a display device having the display panel stated above.

In the display panel according to a first aspect of the present application, the display panel includes an active area and a non-active area surrounding the active area, the non-active area includes a bending and controlling area, the bending and controlling area is separate from the active area and includes a bending area and a controlling area, the controlling area includes a first controlling area and a second controlling area, the first controlling area is located between the active area and the bending area, and the second controlling area is located on one side of the bending area that is away from the active area;

the display panel includes:
a substrate;
a multilayer insulating layer, wherein the multilayer insulating layer is disposed on one side of the substrate, the multilayer insulating layer has a depression part, the depression part is located within the non-active area, and at least part of an orthographic projection of the depression part on the substrate is located within the bending area, and a filling member is disposed inside the depression part; and
a back-film component, wherein the back-film component is disposed on one side of the substrate that is back to the multilayer insulating layer, and a thickness of the back-film component that is located within the active area is less than a thickness of the back-film component that is located within the controlling area, and is greater than a thickness of the back-film component that is located within the bending area; and
the display panel has a marker, the marker is located within the non-active area, and is separately disposed around the depression part, and the marker is suitable for serving as a correction reference of the bending area.

In the display panel according to the present application, by disposing the marker on the display panel, the marker may be located within the non-active area, and separately disposed around the depression part, so that the marker may serve as the correction reference of the bending area, thereby effectively ensuring that the marker may be normally identified in the precision correction of the back-film removal, which ensures the precision of the back-film removal of the display panel, increases the precision of the bending of the display panel, and ensures the yield, whereby the display panel may be better suitable for the demand on further shrinking the border frame.

In some embodiments, a first boundary is formed between the bending area and the first controlling area, a second boundary is formed between the bending area and the second controlling area, and a quantity of the markers is more than one and the marker includes:
a first marker, wherein the first marker is separately disposed on one side of the depression part that is close to the active area, and the first marker is suitable for serving as a correction reference of the first boundary; and
a second marker, wherein the second marker is separately disposed on one side of the depression part that is away from the active area, and the second marker is suitable for serving as a correction reference of the second boundary.

In some embodiments, the marker is suitable for serving as a correction reference of the depression part.

In some embodiments, the depression part has a third boundary and a fourth boundary that are opposite, and a quantity of the markers is more than one and the marker includes:
a first marker, wherein the first marker is separately disposed on one side of the depression part that is close to the active area, and the first marker is suitable for serving as a correction reference of the third boundary; and
a second marker, wherein the second marker is separately disposed on one side of the depression part that is away from the active area, and the second marker is suitable for serving as a correction reference of the fourth boundary.

In some embodiments, the display panel further includes a signal-line layer located on one side of the depression part that is away from the substrate; and:
within the bending area, the signal-line layer is disposed between the substrate and the filling member, the orthographic projection of the depression part on the substrate is located within an orthographic projection of the signal-line layer on the substrate, and the signal-line layer is electrically connected to a data line within the active area.

In some embodiments, the depression part includes a plurality of grooves that are sequentially stacked in a direction perpendicular to the substrate, and the filling member fills the plurality of grooves.

In some embodiments, the marker is separately disposed around the signal-line layer, and an orthographic projection of the marker on the substrate does not overlap with the orthographic projection of the signal-line layer on the substrate; or the marker is located on one side of the signal-line layer that is close to the substrate, an orthographic projection of the marker on the substrate is located within an area of an orthographic projection of the signal-line layer on the substrate, and a boundary of the orthographic projection of the marker on the substrate and a boundary of the orthographic projection of the signal-line layer on the substrate are separate; or the signal-line layer includes a plurality of connecting lines that are separate, the marker is disposed on one side of the signal-line layer that is close to the substrate, and the orthographic projection of the marker on the substrate is located between orthographic projections of two neighboring connecting lines on the substrate.

In some embodiments, the bending area extends in a direction of a boundary of the active area, a quantity of the markers is more than one, and the plurality of markers are separately arranged in an extending direction of the bending area.

In some embodiments, the marker is located in the multilayer insulating layer.

In some embodiments, the marker is formed as pan L shape, a cross shape, a polygonal shape, a circular shape or an elliptical shape.

A display device according to a second aspect of the present application includes the display panel according to the first aspect of the present application.

The display device according to the present application, by using the display panel stated above, is better suitable for the demand on further shrinking the border frame.

Some of the additional aspects and advantages of the present application will be given in the following description, and some will become apparent from the following description or be known from the implementation of the present application.

Figure 1:
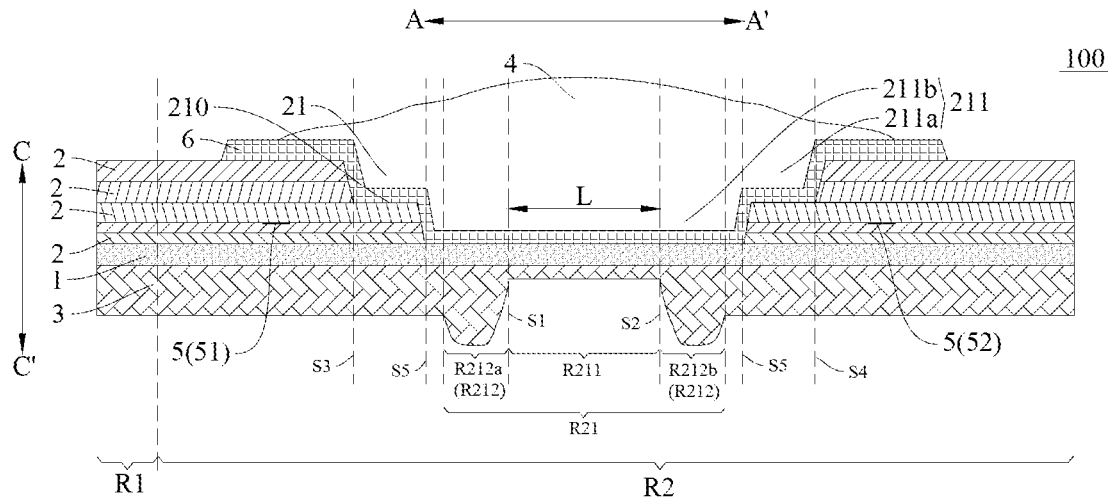
FIG. 1 is a sectional view of the display panel according to an embodiment of the present application.

REFERENCE NUMBERS display panel 100;
active area R1, non-active area R2, bending and controlling area R21;
bending area R211, first boundary S1, second boundary S2;
controlling area R212, first controlling area R212a, second controlling area R212b;
substrate 1;
insulating layer 2, depression part 21, third boundary S3, fourth boundary S4, step component 210;
grooves 211, first groove 211a, second groove 211b, boundary S5 of second groove;
back-film component 3, filling member 4;
marker 5, first markers 51, second markers 52; and
signal-line layer 6, connecting lines 61, data line 8.

DETAILED DESCRIPTION

The embodiments of the present application will be described in detail below, and the examples of the embodiments are illustrated in the drawings, wherein the same or similar reference numbers throughout the drawings indicate the same or similar elements or elements having the same or similar functions. The embodiments described below with reference to the drawings are exemplary, are intended to interpret the present application, and should not be construed as a limitation on the present application.

The disclosure below provides many different embodiments or examples for the implementation of different configurations of the present application. In order to simplify the disclosure of the present application, components and configurations of specific examples will be described below. Certainly, they are merely examples, and are not intended to limit the present application. Furthermore, the present application may repeat the reference numbers and/or letters in the different examples. Such repeating is for the purpose of simplification and clarity, and it does not indicate the relation between the various discussed embodiments and/or configurations. Furthermore, the present application provides examples of various particular processes and materials, but a person skilled in the art may envisage the applicability of other processes and/or the usage of other materials.

A display panel 100 according to an embodiment in the first aspect of the present application will be described below with reference to the drawings. The display panel 100 may be a flexible display panel, but is not limited thereto.

Figure 3:
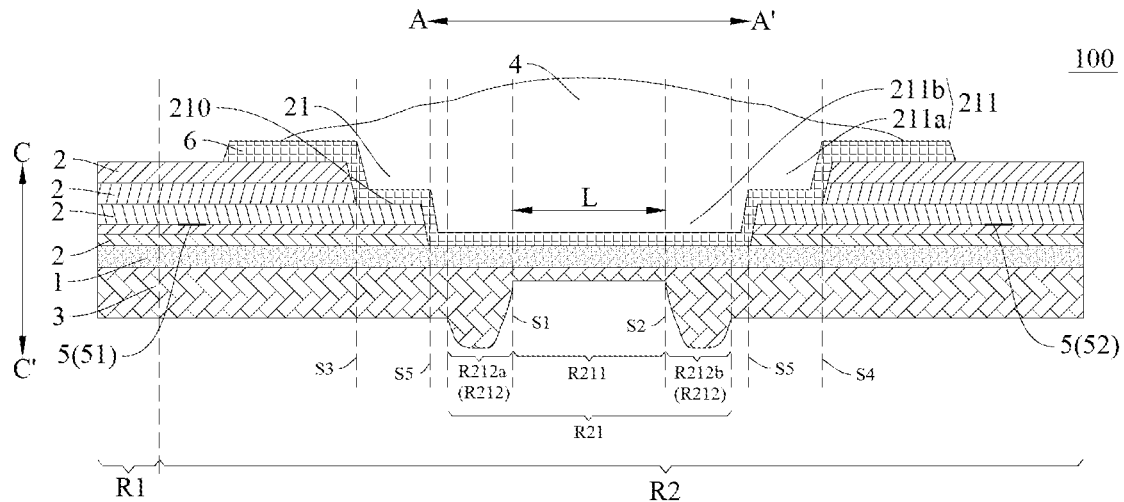
FIG. 3 is a sectional view of the display panel according to another embodiment of the present application.

As shown in FIGS. 1 and 3, the display panel 100 includes an active area R1 and non-active area R2 surrounding the active area R1. The non-active area R2 is located at the periphery of the active area R1, and the non-active area R2 includes a bending and controlling area R21. The bending and controlling area R21 and the active area R1 are separate, and the bending and controlling area R21 includes a bending area R211 and a controlling area R212. The controlling area R212 includes a first controlling area R212a and a second controlling area R212b, The first controlling area R212a is located between the active area R1 and the bending area R211. Accordingly, the first controlling area R212a is located on the side of the bending area R211 that is close to the active area R1, and the second controlling area R212b is located on the side of the bending area R211 that is away from the active area R1.

The display panel 100 may have a modeling condition. In the modeling condition, the bending area R211 is bent to form a bent part, whereby a part of the non-active area R2 is located under the active area R1; in other words, a part of the non-active area R2 is located on the back side of the active area R1, which may reduce the width of the border frame of the display panel 100, to facilitate to realize a design of narrow border frame. If the bent part corresponds to a radius of R, then the length L of the bending area R211 in the bending direction is approximately $\pi R$.

As shown in FIGS. 1 and 3, the display panel 100 includes a substrate 1 and a multilayer insulating layer 2, the multilayer insulating layer 2 is disposed on one side of the substrate 1, the multilayer insulating layer 2 has a depression part 21, the depression part 21 is located within the non-active area R2, at least part of the orthographic projection of the depression part 21 on the substrate 1 is located within the bending area R211, and a filling member 4 is disposed inside the depression part 21. For example, in the examples of FIGS. 1 and 3, the multilayer insulating layer 2 is disposed on one side of the substrate 1 in the thickness direction (for example, the direction CC in FIG. 1), the multilayer insulating layer 2 is in stack in the thickness direction of the substrate 1, and at least part of the depression part 21 and the bending area R211 face each other in the thickness direction of the substrate 1.

The display panel 100 further includes a back-film component 3, the back-film component 3 is disposed on the side of the substrate 1 that is hack to the multilayer insulating layer 2, the thickness of the back-film component 3 that is located within the active area R1 is less than the thickness of the back-film component 3 that is located within the controlling area R212, and the thickness of the back-film component 3 that is located within the active area R1 is greater than the thickness of the back-film component 3 that is located within the bending area R211.

Accordingly, as comparison, the back-film component 3 located at the bending area R211 has a lower thickness. Moreover, at least part of the orthographic projection of the depression part 21 on the substrate 1 is located within the bending area R211, and accordingly at least part of the orthographic projection of the depression part 21 in the thickness direction of the substrate 1 is located within the bending area R211, whereby thin back-film component 3 and insulating layer 2 are reserved within the bending, area R211. Furthermore, the filling member 4 is disposed inside the depression part 21, which facilitates to control the circuit layer within the bending area R211, for example, the signal-line layer 6, to be located at the "neutral layer", i.e., facilitates to enable the circuit layer within the bending area R211 to be located at the middle position in the thickness direction of the display panel 100. Accordingly, in the process of bending the bending area R211, it is ensured that the circuit layer bears the minimum stress, to prevent damaging the circuit layer after the bending (for example, cracks, breakage and so on), which effectively ensures the reliability of the circuit layer.

In the processing of the display panel 100, it is required to perform back-film removal to the bending area R211, i.e., removing a part of the back-film component 3 located within the bending area R211, to reduce the thickness of the back-film component 3 located within the bending area R211. For example, the back-film component 3 may be of a constant-thickness structure before the back-film removal. In the process of the back-film removal, for example, back-film removal using laser, a heat-affected area is formed on the two sides of the bending area R211, wherein the thickness of the back-film component 3 within the heat-affected area is greater than the thickness of the back-film component 3 before the back-film removal, and the controlling area R212 is formed corresponding to the heat-affected area.

As shown in FIGS. 1-5, the display panel 100 has a marker 5. The marker 5 is located within the non-active area R2, and the marker 5 is separately disposed around the depression part 21. The marker 5 is separate from the boundary of the depression part 21 (for example, the third boundary S3 and the fourth boundary S4 described below), and the limiter 5 is disposed on at least one side of the depression part 21, which includes the following cases. In the 1st case, the marker 5 is separately disposed on the side of the depression part 21 that is close to the active area R1. In the 2nd case, the marker 5 is separately disposed on the side of the depression part 21 that is away from the active area R1. In the 3rd case, markers 5 are disposed on one side of the depression part 21 that is close to the active area R1 and the side of the depression part 21 that is away from the active area R1.

The marker 5 is suitable for serving as the correction reference of the bending area R211. Accordingly, the marker 5 is suitable for serving as a precision reference of the boundary of the bending area R211, or, in other words, the marker 5 is suitable for serving as a precision reference of the back-film removal. That may effectively ensure that, in the precision correction of the back-film removal, the marker 5 may be normally identified, which ensures the normal correction of the precision of the back-film removal of the display panel 100, and in turn improves the bending precision of the display panel 100, to improve the product quality, and ensure the yield of the display panel 100. Moreover, that facilitates to ensure that the display panel 100 is better suitable for the demand on further shrinking the border frame.

Furthermore, the marker 5 is separately disposed around the depression part 21, whereby the marker 5 has a sufficient arrangement room, which facilitates the arrangement of the marker 5, and facilitates to enable the marker 5 to have a suitable size, to ensure the normal identification in the precision correction of the back-film removal.

Accordingly, the present application is different from some techniques in which the boundary of the depression part 21 is used as the correction reference of the bending area R211; in other words, the distance between the boundary of the bending area R211 and the boundary of the depression part 21 is monitored. In those techniques, when the demand on further shrinking the border frame of the display panel 100 is to be met, because the border frame is further shrunken, the width of the depression part 21 is reduced correspondingly, which causes that the heat-affected area and the boundary of the depression part 21 easily interfere. Further, because the thickness of the back-film component 3 within the heat-affected area is not even, in the precision correction of the back-film removal, the boundary of the depression part 21 is abnormally identified, and the precision of the back-film removal cannot be ensured, which affects the yield of the bending of the display pita 100. In the present application, by disposing the marker 5 on the display panel 100, the marker 5 may be separately disposed around the depression part 21, to effectively ensure that the marker 5 may be normally identified in the precision correction of the back-film removal, which ensures the precision of the back-film removal of the display panel 100, increases the precision of the bending of the display panel 100, and ensures the yield, whereby the display panel 100 may be better suitable for the demand on further shrinking the border frame.

For example, in the examples of FIGS. 1 and 3, the area corresponding to the depression part 21 is larger than the bending area R211, and accordingly the boundaries of the depression part 21 are located outside the corresponding boundaries of the bending area R211, to ensure that the circuit layer within the bending area R211, for example, the signal-line layer, to be located at the "neutral layer". Further, the area corresponding to the depression part 21 may be larger than, equal to or smaller than the bending and controlling area R21.

In some embodiments, the filling member 4 is an MCL adhesive; in other words, the material of the filling member 4 is a UV adhesive. The thickness of the filling member 4 may be particularly set according to practical applications.

In some embodiments, as shown in FIGS. 1 and 3, a first boundary S1 is formed between the bending area R211 and the first controlling area R212*a*, and a second boundary S2 is formed between the bending area R211 and the second controlling area R212*b* In other words, the first boundary S1 is the boundary between the bending area R211 and the first controlling area R212*a*, and the second boundary S2 is the boundary between the bending area R211 and the second controlling area R212*b*. A quantity of the marker is more than one and the markers include a first marker 51 and a second marker 52. The first marker 51 is separately disposed on the side of the depression part 21 that is close to the active area R1, and the first marker 51 is suitable for serving as the correction reference of the first boundary S1. The second marker 52 is separately disposed on the side of the depression part 21 that is away from the active area R1, and the second marker 52 is suitable for serving as the correction reference of the second boundary S2. Accordingly, as compared with the second marker 52, the distance between the first marker 51 and the first boundary S1 is shorter, whereby, in the precision correction of the back-film removal, the first marker 51 and the first boundary S1 may be located within the correction visual-field area at a same time, thereby ensuring the correction precision. Moreover, as compared with the first marker 51, the distance between the second marker 52 and the second boundary S2 is shorter, whereby, in the precision correction of the back-film removal, the second marker 52 and the second boundary S2 may be located within the correction visual-field area at a same time, thereby ensuring the correction precision.

Certainly, the present application is not limited to what is described above. In some other embodiments, the marker 5 may also include a first marker 51 or a second marker 52. For example, when the marker 5 includes the first marker 51 and does not include the second marker 52, the first marker 51 is separately disposed on the side of the depression part 21 that is close to the active area R1, and in this case the first marker 51 is suitable for serving as the collection reference of the first boundary S1 and the second boundary S2. As another example. When the marker 5 includes the second marker 52 and does not include the first marker 51, the second marker 52 is separately disposed on the side of the depression part 21 that is away from the active area R1, and in this case the second marker 52 is suitable for serving as the correction reference of the first boundary S1 and the second boundary S2. Accordingly the marker 5 is flexibly configured, which facilitates to realize diversified design of the display panel 100, to be better suitable for practical applications.

In some embodiments, as shown in FIG. 1, the marker 5 is suitable for serving as the correction reference of the depression part 21. Accordingly, the marker 5 is suitable for serving as a precision reference of the boundary of the depression part 21, to ensure the position precision of the depression part 21. In this case, the marker 5 is suitable for serving as the correction references of the bending area R211 and the depression part 21, which facilitates to ensure the relative position precision of the depression part 21 and the bending area R211, to improve the product quality.

The bending area R211 and the depression part 21 may use the same one marker 5 as the correction references, and may also use different markers 5 as the correction references.

In some embodiments, as shown in FIGS. 1 and 3, the depression part 21 has a third boundary S3 and a fourth boundary S4 that are opposite. A quantity of the marker is more than one and the plurality of markers 5 include a first marker 51 and a second marker 52. The first marker 51 is separately disposed on the side of the depression part 21 that is close to the active area R1, and the first marker 51 is suitable for serving as the correction reference of the third boundary S3. The second marker 52 is separately disposed on the side of the depression part 21 that is away from the active area R1, and the second marker 52 is suitable for serving as the correction reference of the fourth boundary S4. Accordingly, as compared with the second marker 52, the distance between the first marker 51 and the third boundary S3 is shorter, whereby, in the precision correction, the first marker 51 and the third boundary S3 may be located within the correction visual-field area at a same time, thereby ensuring the collection precision. Moreover, as compared with the first marker 51, the distance between the second marker 52 and the fourth boundary S4 is shorter, whereby, in the precision correction, the second marker 52 and the fourth boundary S4 may be located within the correction visual-field area at a same time, thereby ensuring the correction precision.

For example, the distance between the marker 5 and the boundary of the depression part 21 may be approximately 150 μm. For example, when the marker 5 includes the first marker 51, the distance between the first marker 51 and the boundary of the depression part 21 that is close to one side of the active area R1 is approximately 150 μm, and when the marker 5 includes the second marker 52, the distance between the second marker 52 and the boundary of the depression part 21 that is away from one side of the active area R1 is approximately 150 μm. Certainly, the spacing between the marker 5 and the boundary of the depression part 21 may also be set to be other numerical values according to practical applications.

In some embodiments, as shown in FIGS. 1 and 3, the display panel 100 further includes a signal-line layer 6 located on the side of the depression part 21 that is away from the substrate 1. The signal-line layer 6 is electrically connected to a data line 8 within the active area R1. Within the bending area R211, the signal-line layer 6 is disposed between the substrate 1 and the filling member 4. For example, within the bending area R211, the depression part 21 extends throughout the multilayer insulating layer 2. The orthographic projection of the depression part 21 on the substrate 1 is located within the orthographic projection of the signal-line layer 6 on the substrate 1. Accordingly, the area corresponding to the signal-line layer 6 is larger than the area corresponding to the depression part 21, which facilitates to realize the electric connection between the signal-line layer 6 and the data line 8.

Figure 2:
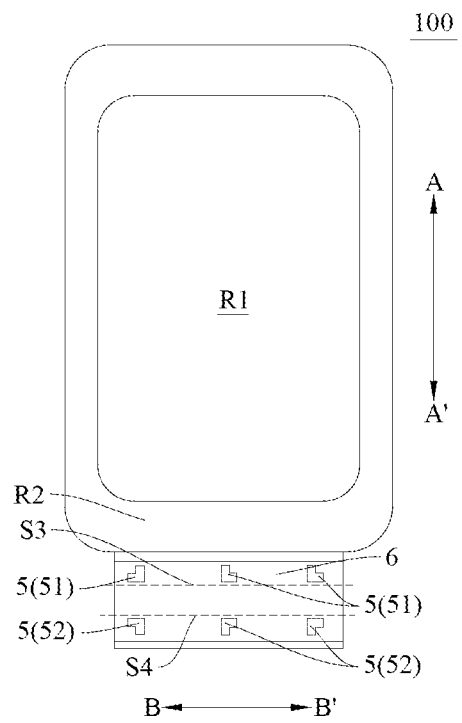
FIG. 2 is another schematic diagram of the display panel shown in FIG. 1.
Figure 4:
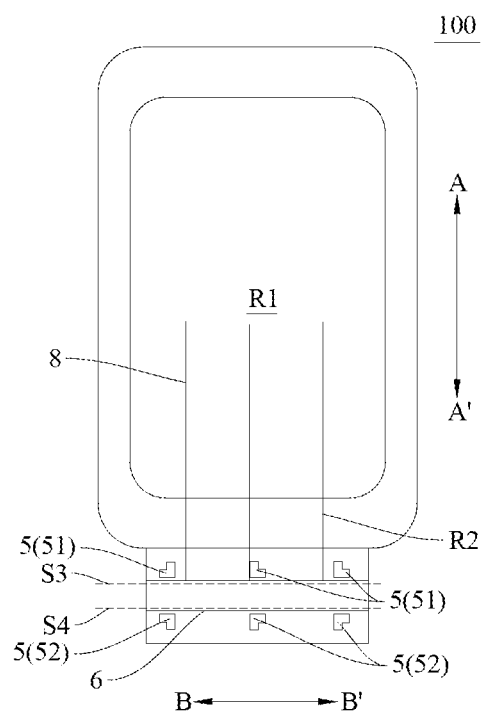
FIG. 4 is another schematic diagram of the display panel shown in FIG. 3.

It can be understood that, in the present application, the marker 5 is separately disposed around the depression part 21, and, accordingly, on the basis of that, the marker 5 may be disposed around the signal-line layer 6, and/or the orthographic projection of the marker 5 on the substrate 1 is located within the orthographic projection of the signal-line layer 6 on the substrate 1, which includes the following cases. In the 1st case, the marker 5 is separately disposed around the signal-line layer 6 (as shown in FIGS. 3 and 4). In the 2nd case, the marker 5 is separately disposed around the depression part 21, and the orthographic projection of the marker 5 on the substrate 1 is located within the orthographic projection of the signal-line layer 6 on the substrate 1 (as shown in FIGS. 1 and 2). In the 3rd case, the markers 5 are disposed both within and outside the orthographic projection of the signal-line layer 6 on the substrate 1.

For example, if the marker 5 includes the first marker 51, and the first marker 51 is separately disposed on the side of the depression part 21 that is close to the active area R1, then the first marker 51 may be separately disposed on the side of the signal-line layer 6 that is close to the active area R1 (as shown in FIGS. 3 and 4), or the first marker 51 is separately disposed around the depression part 21, and the orthographic projection of the first marker 51 on the substrate 1 is located within the orthographic projection of the signal-line layer 6 on the substrate 1 (as shown in FIGS. 1 and 2). As another example, if the marker 5 includes the second marker 52, and the second marker 52 is separately disposed on the side of the depression part 21 that is away from the active area R1, then the second marker 52 may be separately disposed on the side of the signal-line layer 6 that is away from the active area R1 (as shown in FIGS. 3 and 4), or the second marker 52 is separately disposed around the depression part 21, and the orthographic projection of the second marker 52 on the substrate 1 is located within the orthographic projection of the signal-line layer 6 on the substrate 1 (as shown in FIGS. 1 and 2). Accordingly, the configuration of the position of the marker 5 is diverse, and the suitable position may be selected according to actual processes and so on.

In some embodiments, as shown in FIGS. 1 and 3, the depression part 21 includes a plurality of grooves 211 that are sequentially stacked in the direction perpendicular to the substrate 1. One groove 211 among two neighboring grooves 211 that is close to the substrate 1 may be formed by depressing of a part of the bottom wall of the other groove 211, and accordingly the two side walls of the depression part 21 in the bending direction are individually formed with at least one step component 210. The filling member 4 fills the plurality of grooves 211, which facilitates to ensure that the signal-line layer 6 within the bending area R211 is located at the "neutral layer". Moreover, by disposing the plurality of grooves 211, the length of the signal-line layer 6 may be increased to a certain extent, and the thickness of the insulating layer 2 corresponding to each of the grooves 211 is low, whereby the signal-line layer 6 is better suitable for the bending process of the display panel 100. In the description of the present application, the meaning of "plurality of" is "two or more".

For example, in the examples of FIGS. 1 and 3, a quantity of the step component 210 is one, the depression part 21 includes a first groove 211a and a second groove 211b, the second groove 211b is located on the side of the first groove 211a that is close to the substrate 1, the boundaries of the first groove 211a individually correspond to the third boundary S3 and the fourth boundary S4, and the marker 5 is separately located on the side of the third boundary S3 that is close to the active area R1 and/or separately located on the side of the fourth boundary S4 that is away from the active area R1. Accordingly, the present application is different from some techniques in which the boundary S5 of the second groove is used as the correction reference of the bending area R211. In those techniques, when the demand on further shrinking the border frame of the display panel 100 is to be met, because the border frame is further shrunken, the width of the depression part 21 is reduced correspondingly, which causes that the heat-affected area and the boundary S5 of the second groove easily interfere. Further, because the thickness of the back-film component 3 within the heat-affected area is not even, in the precision correction of the back-film removal, the boundary S5 of the second groove is abnormally identified, and the precision of the back-film removal cannot be ensured, which affects the yield of the bending of the display panel 100. In the present application, by disposing the marker 5 on the display panel 100, it is effectively ensured that the marker 5 may be normally identified in the precision correction of the back-film removal, which ensures the precision of the back-film removal of the display panel 100.

In the example of FIG. 1, the depression part 21 may extend throughout the insulating layer 2 in the thickness direction of the display panel 100. For example, in the example of FIG. 1, the depression part 21 includes a first groove 211a and a second groove 211b, the second groove 211b is located on the side of the first groove 211a that is close to the substrate 1, and the second groove 211b extends throughout the multilayer insulating layer 2. The multilayer insulating layer 2 may include multiple layers of inorganic substrates.

Figure 5:
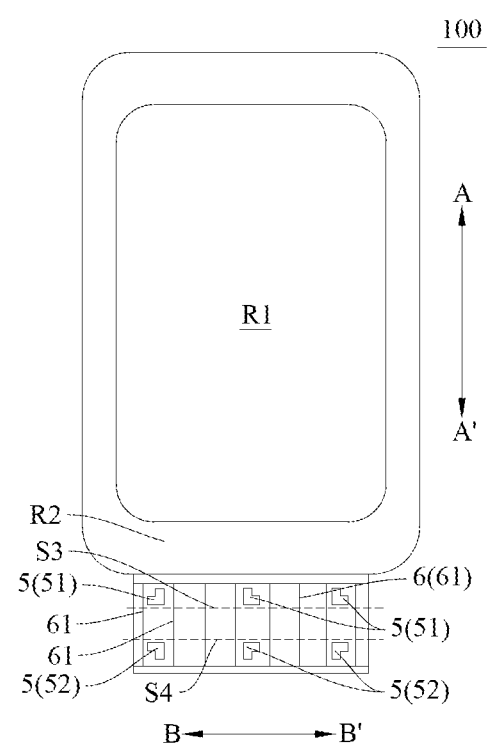
FIG. 5 is a schematic diagram of the display panel according to yet another embodiment of the present application.

In some embodiments, as shown in FIGS. 3 and 4, the marker 5 is separately disposed around the signal-line layer 6, and the orthographic projection of the marker 5 on the substrate 1 does not overlap with the orthographic projection of the signal-line layer 6 on the substrate 1. Accordingly, the orthographic projection of the marker 5 on the substrate 1 and the orthographic projection of the signal-line layer 6 on the substrate 1 are completely separated. In some other embodiments, as shown in FIGS. 1 and 2, the marker 5 is located on the side of the signal-line layer 6 that is close to the substrate 1, the orthographic projection of the marker 5 on the substrate 1 is located within the area of the orthographic projection of the signal-line layer 6 on the substrate 1, and the boundary of the orthographic projection of the marker 5 on the substrate 1 and the boundary of the orthographic projection of the signal-line layer 6 on the substrate 1 are separate, to facilitate to ensure the effective identification on the marker 5. In some other embodiments, as shown in FIG. 5, the signal-line layer 6 includes a plurality of connecting lines 61 that are separate, the marker 5 is disposed on the side of the signal-line layer 6 that is close to the substrate 1, and the orthographic projection of the marker 5 on the substrate 1 is located between the orthographic projections of two neighboring connecting lines 61 on the substrate 1, to facilitate to ensure the effective identification on the marker 5. The mode of the arrangement of the connecting lines 61 may be particularly set according to practical applications. Accordingly, the position of the marker 5 is flexibly configured, which facilitates to realize diversified design of the display panel 100.

In some embodiments, as shown in FIGS. 1 and 3, the marker 5 is located in the multilayer insulating layer 2. For example, the marker 5 may be disposed between any two neighboring insulating layers 2 in the multilayer insulating layer 2, to facilitate to ensure that the marker 5 may by effectively identified. For example, the marker 5 may be formed by etching, but is not limited thereto.

In some embodiments, the marker 5 may be disposed at a silicon layer or a metal layer in the multilayer insulating layer 2, which further ensures the normal identification on the marker 5 in the precision correction of the back-film removal.

In some embodiments, as shown in FIG. 2, the bending area R211 extends in the direction of the boundary of the active area R1 (for example, the direction BB' in FIG. 2), a quantity of the markers 5 is more than one, and the plurality of markers 5 are separately arranged in the extending direction of the bending area R211, to facilitate to ensure the uniformity of the width of the bending area R211 in the direction of the boundary of the active area R1, which further ensures the precision of the back-film removal of the display panel 100.

For example, in the example of FIG. 2, the quantity of the markers 5 is six, the six markers 5 include three first markers 51 and three second markers 52, the three first markers 51 are separately arranged in the extending direction of the bending area R211, the three second markers 52 are separately arranged in the extending direction of the bending area R211, both of one of the first markers 51 and one of the second markers 52 are located substantially at a middle position of the bending area R211 in its extending direction, and the other two first markers 51 and the other two second markers 52 are individually close to the two ends of the bending area R211 in the extending direction. Certainly, the quantity of the markers 5 may also be two, three, four or more.

It can be understood that the shapes of the plurality of markers 5 may be the same or different. When the shapes of the plurality of markers 5 are the same, the placement angles of the plurality of markers 5 may be the same or different. For example, in the example of FIG. 2, the shapes of the plurality of markers 5 are the same, to facilitate identification, and the placement angles of the plurality of markers 5 are not completely the same.

In some embodiments, as shown in FIG. 2, the marker 5 is formed as a pattern marker. For example, the marker 5 may be formed as L shape, a cross shape, a polygonal shape, a circular shape or an elliptical shape and so on. Certainly, the shape of the marker 5 is not limited thereto; for example, the marker 5 may also be formed as a number marker.

For example, in the example of FIG. 2, the marker 5 is formed as an L shape, the marker 5 may include a first side and a second side, the first side and the second side may be perpendicularly connected, and the side edges of the bending area R211 may be parallel to the first side or the second side.

A display device according to the embodiments in a second aspect of the present application includes the display panel 100 according to the embodiments in the first aspect of the present application.

The display device according to the embodiments of the present application, by using the display panel 100 stated above, is better suitable for the demand on further shrinking the border frame.

Furthermore, it should be noted that the particular type of the display device according to the embodiments of the present application is not limited. For example, it may be any products or components that have the function of displaying, such as a mobile phone, a monitor, a tablet personal computer, a television set, a notebook computer, a digital photo frame, a navigator and a wearable device. Furthermore, the other components and operations of the display device according to the embodiments of the present application, when the particular type of the display device has been determined, are known to a person skilled in the art, and are not described in detail herein.

In the description of the present application, it Should be understood that the terms that indicate orientation or position relations, such as "central", "length", "width", "thickness", "upper", "lower", "vertical", "horizontal", "inner" and "outer", are based on the orientation or position relations shown in the drawings, and are merely for conveniently describing the present application and simplifying the description, rather than indicating or implying that the device or element must have the specific orientation and be constructed and operated according to the specific orientation. Therefore, they should not be construed as a limitation on the present application.

Furthermore, the terms "first" and "second" are merely for the purpose of describing, and should not be construed as indicating or implying the degrees of importance or implicitly indicating the quantity of the specified technical features. Accordingly, the features defined by "first" or "second" may explicitly or implicitly comprise one or more of the features.

In the present application, unless explicitly defined or limited otherwise, the terms "mount", "connect", "link" and "fix" should be interpreted broadly. For example, it may be fixed connection, detachable connection, or integral connection; it may be mechanical connection, may also be electric connection, and may also be communicative connection; and it may be direct connection or indirect connection by an intermediate medium, and may be internal communication between two elements or interaction between two elements. A person skilled in the art can determine the particular meaning of the terms in the present application according to particular situations.

In the present application, unless explicitly defined or limited otherwise, that a first feature is "over" or "under" a second feature may include that the first feature and the second feature directly contact or that the first feature and the second feature indirectly contact via an intermediate medium. Furthermore, that a first feature is "above" a second feature may include that the first feature is directly over or obliquely over the second feature, or merely indicates that the vertical height of the first feature is greater than that of the second feature. That a first feature is "below" a second feature may include that the first feature is directly under or obliquely under the second feature, or merely indicates that the vertical height of the first feature is less than that of the second feature.

In the description of the present application, the description referring to the terms "an embodiment", "some embodiments", "example", "particular example" or "some examples" and so on means that particular features, structures, materials or characteristics described with reference to the embodiment or example are comprised in at least one of the embodiments or examples of the present application. In the description, the illustrative expressions of the above terms do not necessarily relate to the same embodiment or example. Furthermore, the described particular features, structures, materials or characteristics may be combined in one or more embodiments or examples in a suitable form. Furthermore, subject to avoiding contradiction, a person skilled in the art may combine different embodiments or examples described in the description and the features of the different embodiments or examples.

Although the embodiments of the present application have already been illustrated and described, a person skilled in the art can understand that those embodiments may have various alterations, modifications, substitutions and variations without departing from the principle and the spirit of the present application, and the scope of the present application is defined by the claims and the equivalents thereof.

The invention claimed is:

1. A display panel, wherein the display panel comprises an active area and a non-active area surrounding the active area, the non-active area comprises a bending and controlling area, the bending and controlling area is separate from the active area and comprises a bending area and a controlling area, the controlling area comprises a first controlling area and a second controlling area, the first controlling area is located between the active area and the bending area, and the second controlling area is located on one side of the bending area that is away from the active area;

the display panel comprises:

a substrate;

a multilayer insulating layer, wherein the multilayer insulating layer is disposed on one side of the substrate, the multilayer insulating layer has a depression part, the depression part is located within the non-active area, and at least part of an orthographic projection of the depression part on the substrate is located within the bending area, and a filling member is disposed inside the depression part; and a back-film component, wherein the back-film component is disposed on one side of the substrate that is back to the multilayer insulating layer, and a thickness of the back-film component that is located within the active area is less than a thickness of the back-film component that is located within the controlling area, and is greater than a thickness of the back-film component that is located within the bending area; and the display panel has a marker, the marker is located within the non-active area, and is separately disposed around the depression part, and the marker is suitable for serving as a correction reference of the bending area.

2. The display panel according to claim 1, wherein a first boundary is formed between the bending area and the first controlling area, a second boundary is formed between the bending area and the second controlling area, and a quantity of the marker is more than one and the marker includes:

a first marker, wherein the first marker is separately disposed on one side of the depression part that is close to the active area, and the first marker is suitable for serving as a correction reference of the first boundary; and a second marker, wherein the second marker is separately disposed on one side of the depression part that is away from the active area, and the second marker is suitable for serving as a correction reference of the second boundary.

3. The display panel according to claim 1, wherein the marker is suitable for serving as a correction reference of the depression part.

4. The display panel according to claim 3, wherein the depression part has a third boundary and a fourth boundary that are opposite, and a quantity of the markers is more than one and the marker includes:

a first marker, wherein the first marker is separately disposed on one side of the depression part that is close to the active area, and the first marker is suitable for serving as a correction reference of the third boundary; and a second marker, wherein the second marker is separately disposed on one side of the depression part that is away from the active area, and the second marker is suitable for serving as a correction reference of the fourth boundary.

5. The display panel according to claim 1, wherein the display panel further comprises a signal-line layer located on one side of the depression part that is away from the substrate; and within the bending area, the signal-line layer is disposed between the substrate and the filling member, the orthographic projection of the depression part on the substrate is located within an orthographic projection of the signal-line layer on the substrate, and the signal-line layer is electrically connected to a data line within the active area.

6. The display panel according to claim 5, wherein the depression part comprises a plurality of grooves that are sequentially stacked in a direction perpendicular to the substrate, and the filling member fills the plurality of grooves.

7. The display panel according to claim 5, wherein the marker is separately disposed around the signal-line layer, and an orthographic projection of the marker on the substrate does not overlap with the orthographic projection of the signal-line layer on the substrate; or the marker is located on one side of the signal-line layer that is close to the substrate, an orthographic projection of the marker on the substrate is located within an area of an orthographic projection of the signal-line layer on the substrate, and a boundary of the orthographic projection of the marker on the substrate and a boundary of the orthographic projection of the signal-line layer on the substrate are separate; or the signal-line layer comprises a plurality of connecting lines that are separate, the marker is disposed on one side of the signal-line layer that is close to the substrate, and the orthographic projection of the marker on the substrate is located between orthographic projections of two neighboring connecting lines on the substrate.

8. The display panel according to claim 1, wherein the bending area extends in a direction of a boundary of the active area, a quantity of the markers is more than one, and the plurality of markers are separately arranged in an extending direction of the bending area.

9. The display panel according to claim 1, wherein the marker is located in the multilayer insulating layer.

10. The display panel according to claim 1, wherein the marker is formed as an L shape, a cross shape, a polygonal shape, a circular shape or an elliptical shape.

11. A display device, wherein the display device comprises the display panel according to claim 1.

12. The display device according to claim 11, wherein a first boundary is formed between the bending area and the first controlling area, a second boundary is formed between the bending area and the second controlling area, and a quantity of the marker is more than one and the marker includes:

a first marker, wherein the first marker is separately disposed on one side of the depression part that is close to the active area, and the first marker is suitable for serving as a correction reference of the first boundary; and a second marker, wherein the second marker is separately disposed on one side of the depression part that is away from the active area, and the second marker is suitable for serving as a correction reference of the second boundary.

13. The display device according to claim 11, wherein the marker is suitable for serving as a correction reference of the depression part.

14. The display device according to claim 13, wherein the depression part has a third boundary and a fourth boundary that are opposite, and a quantity of the markers is more than one and the marker includes:

a first marker, wherein the first marker is separately disposed on one side of the depression part that is close to the active area, and the first marker is suitable for serving as a correction reference of the third boundary; and a second marker, wherein the second marker is separately disposed on one side of the depression part that is away from the active area, and the second marker is suitable for serving as a correction reference of the fourth boundary.

15. The display device according to claim 11, wherein the display panel further comprises a signal-line layer located on one side of the depression part that is away from the substrate; and within the bending area, the signal-line layer is disposed between the substrate and the filling member, the orthographic projection of the depression part on the substrate is located within an orthographic projection of the signal-line layer on the substrate, and the signal-line layer is electrically connected to a data line within the active area.

16. The display device according to claim 15, wherein the depression part comprises a plurality of grooves that are sequentially stacked in a direction perpendicular to the substrate, and the filling member fills the plurality of grooves.

17. The display device according to claim 15, wherein
the marker is separately disposed around the signal-line layer, and an orthographic projection of the marker on the substrate does not overlap with the orthographic projection of the signal-line layer on the substrate; or
the marker is located on one side of the signal-line layer that is close to the substrate, an orthographic projection of the marker on the substrate is located within an area of an orthographic projection of the signal-line layer on the substrate, and a boundary of the orthographic projection of the marker on the substrate and a boundary of the orthographic projection of the signal-line layer on the substrate are separate; or
the signal-line layer comprises a plurality of connecting lines that are separate, the marker is disposed on one side of the signal-line layer that is close to the substrate, and the orthographic projection of the marker on the substrate is located between orthographic projections of two neighboring connecting lines on the substrate.

18. The display device according to claim 11, wherein the bending area extends in a direction of a boundary of the active area, a quantity of the markers is more than one, and the plurality of markers are separately arranged in an extending direction of the bending area.

19. The display device according to claim 11, wherein the marker is located in the multilayer insulating layer.

20. The display device according to claim 11, wherein the marker is formed as an L shape, a cross shape, a polygonal shape, a circular shape or an elliptical shape.

* * * * *